(12) United States Patent
Cai et al.

(10) Patent No.: US 7,824,646 B2
(45) Date of Patent: Nov. 2, 2010

(54) CARBON AND CARBON COMPOSITES WITH HIGHLY ORDERED MESOSIZE PORES

(75) Inventors: Mei Cai, Bloomfield Hills, MI (US); Qingyuan Hu, New Orleans, LA (US); Yunfeng Lu, New Orleans, LA (US); Jing Tang, New Orleans, LA (US)

(73) Assignees: GM Global Technology Operations, Inc., Detroit, MI (US); Tulane University, New Orleans, LA (US)

( * ) Notice: Subject to any disclaimer, the term of this patent is extended or adjusted under 35 U.S.C. 154(b) by 706 days.

(21) Appl. No.: 11/752,954

(22) Filed: May 24, 2007

(65) Prior Publication Data

US 2008/0039580 A1     Feb. 14, 2008

Related U.S. Application Data

(60) Provisional application No. 60/808,392, filed on May 25, 2006.

(51) Int. Cl.
*C01B 31/02*   (2006.01)

(52) U.S. Cl. .................................. 423/445 R; 423/335

(58) Field of Classification Search ................. 423/335, 423/445 R
See application file for complete search history.

(56) References Cited

U.S. PATENT DOCUMENTS

| 5,834,387 | A | 11/1998 | Divakar et al. |
| 7,326,396 | B2 * | 2/2008 | Yu et al. .................. 423/445 R |
| 2004/0047798 | A1 * | 3/2004 | Oh et al. ..................... 423/414 |
| 2004/0096586 | A1 * | 5/2004 | Schulberg et al. ......... 427/372.2 |
| 2005/0019574 | A1 | 1/2005 | McCrary |
| 2005/0169829 | A1 | 8/2005 | Dai et al. |

* cited by examiner

*Primary Examiner*—Satya B Sastri
(74) *Attorney, Agent, or Firm*—Reising Ethington P.C.

(57) ABSTRACT

Mesoporous carbon and silica containing composites are prepared based on the co-assembly of a suitable surfactant in a liquid medium. When a low molecular weight carbonizable polymer and a silica precursor are added to the surfactant solution, a mixture of distinct phases of the materials is formed after solvent evaporation. A polymer/silica solid composite with highly organized mesopores is obtained after surfactant removal. This product has utility as a catalyst support or gas absorbent. And the polymer-silica composite can be easily converted successively to a mesoporous carbon-silica composite and to a bimodal mesoporous carbon material.

9 Claims, 3 Drawing Sheets

CARBON AND CARBON COMPOSITES WITH HIGHLY ORDERED MESOSIZE PORES

This application claims priority based on provisional application 60/808,392, titled "Carbon and Carbon Composites with Highly Ordered Mesosize Pores," filed May 25, 2006 and which is incorporated herein by reference.

TECHNICAL FIELD

This invention pertains to new porous forms of carbon and carbon composites and to methods of preparing such materials. These new carbon materials, some of which contain silica, have highly ordered arrangements of mesopores, and the materials have utility as catalyst supports and absorbent materials.

BACKGROUND OF THE INVENTION

Proton exchange membrane (PEM) fuel cells use electrocatalysts for the oxidation of hydrogen at the anode and reduction of oxygen in air at the cathode. Currently, platinum (Pt) supported on high surface area carbons is the preferred electrocatalyst for PEM fuel cell systems. However, a significant problem hindering large-scale implementation of PEM fuel cell technology is the loss of performance during extended operation and automotive cycling. Recent investigations of the deterioration of cell performance have revealed that a considerable part of the performance loss is due to the degradation of the electrocatalyst. Carbon has been considered as a favorable catalyst support owing to its low cost, good electron conductivity, high surface area, and chemical stability. Still, corrosion of carbon supports on the cathode electrodes of PEM fuel cells is emerging as a challenging issue for long-term stability of PEM type fuel cells.

Before mass-produced automotive fuel cell technology can be made practical, the oxidative instability of carbon, used as the catalyst support at the oxygen electrode, must be addressed. Among the methods being examined for prolonging the lifetime of the catalyst-support is the use of alternative support materials, such as electronically conductive titanium sub-oxides or coatings such as silicates to protect the carbon.

SUMMARY OF THE INVENTION

This invention provides new forms of carbon and carbon composites (for example, with silica) containing a highly ordered mesopore structure. These porous materials have properties useful in catalyst applications and in gas absorption applications. While they may have other applications, they also address the carbon corrosion issue in fuel cell electrodes.

In one embodiment, a carbon-silica composite is formed by incorporating silica into a carbon matrix or network. When the amount of silica is suitably controlled, most advantages of carbon electrode are retained. The content and dispersion of silica within the carbon network is important to the performance of the carbon based electrode. When the content of the ceramic is too high, the electrical conductivity of the carbon may be substantially reduced.

Carbon-ceramic composites have been formed by coating silica gel onto the surfaces of carbon particles by hydrolysis of a silica precursor on the carbon particle surfaces. This forms silica-coated carbon particles. While the ceramic coating may impede oxidation of the carbon particles, the coating also tends to reduce the surface properties of the carbon particles. In a practice of the subject invention, silica species are intimately mixed within and throughout carbon frameworks to form a different composite material.

In accordance with an embodiment of this invention, a novel mesoporous carbon-silica nanocomposite is prepared by a cooperative assembly of a relatively low molecular weight carbonizable polymer, a suitable silica precursor, and a co-polymer surfactant. After evaporation of solvent, the hydrophilic carbonizable polymer polymerizes around the surfactant micelle. At the same time, silica species condense around the micelle too, which leads to the formation of a highly ordered polymer/silica/surfactant nanocomposite. After the removal of the surfactant and followed by carbonization, a solid structure with pores in the mesopore size range is made. The arrangement of the pores is highly organized (like a cubic crystal structure) as a result of the surfactant-organized and promoted liquid crystalline phases of carbonizable polymer and silicate. After the carbon-containing phase and silica precursor phase are organized, the composite is then calcined under nitrogen at 350° C. to remove the surfactant, which leads to the formation of an intimately mixed polymer and silica composite. The ordered structure of the product typically then has a continuous network of closely spaced mesopores. This arrangement of small pores is important and useful when an application, such as fuel cells, relies on the diffusion of a given substance through the mesoporous structure.

Silica, from a small amount up to a substantial portion of the silica-polymer mixture, may be incorporated within the carbon framework. The carbonization of the polymer is conducted by controlled higher temperature calcining under nitrogen to form a mesoporous carbon-silica composite. The silica content of the carbon composite provides corrosion resistant properties to the material. This porous material offers utility as a catalyst support of gas absorbent material.

Then, for other catalyst and/or gas absorption applications, the silica is etched from the composite to form a bimodal porous carbon body. The removal of the silica produces another large group of pores that typically have a different average size than the silica containing material.

Thus, the novel method of this invention may be utilized to synthesize (1) a highly ordered carbonizable polymer-silica mesopore containing composite, or (2) a highly ordered carbon-silica porous composite, or, further, (3) mesoporous carbon materials with two types or sizes of pores (i.e., a bimodal pore structure).

The surfactant is selected to be useful in the uniform interdispersion of small phases, particles, or globules of carbonizable polymer and silica precursor. The surfactant preferably has, for example, a hydrophobic property and a hydrophilic property, and is used in a liquid medium, like water, to form micelles and to interact with both the carbonizable polymer and the silica precursor (e.g., an orthosilicate) to gather them a small separate phases around each surfactant micelle dispersed in the liquid medium. In a preferred embodiment of the invention, a copolymer of hydrophilic polyethylene oxide end blocks and hydrophobic polypropylene oxide central blocks is used with an aqueous dispersion of carbonizable polymer and tetraethyl orthosilicate. This combination "organizes" the carbonizable polymer globules and silica precursor globules in an intimate and thorough mixture to eventually yield a uniform carbon/silica nanocomposite. A solid polymer/silica surfactant nanocomposite is formed after evaporation of the solvent. The surfactant is then volatilized from the solid to leave the above-described silica-carbonizable polymer composite with a highly organized arrangement of mesopores.

Other objects and advantages of the invention will become more apparent from a detailed description of preferred embodiments which follows.

DESCRIPTION OF PREFERRED EMBODIMENTS

Figure 1:
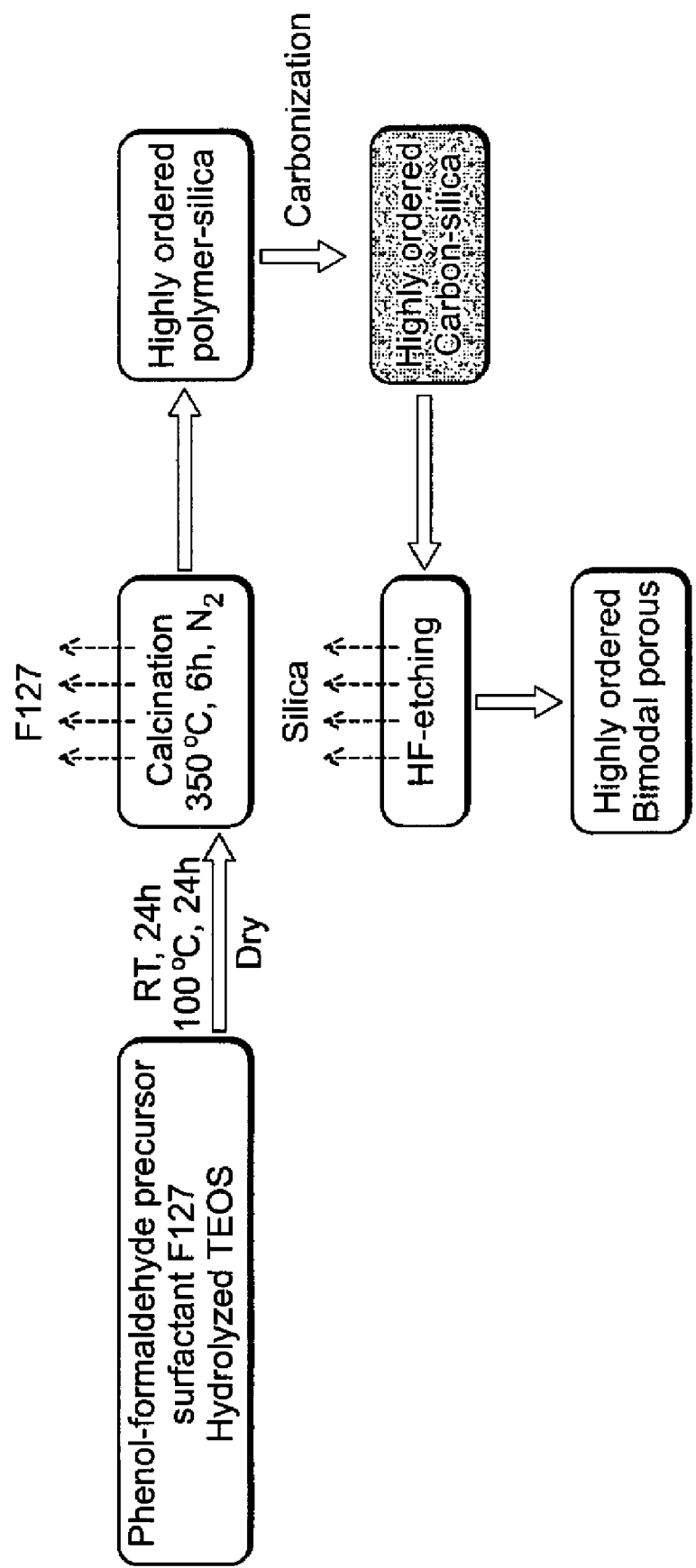
FIG. 1 is a process flow diagram for making a family of carbon-containing products containing many small pores that are uniformly spatially arranged. The pores are highly ordered in their arrangement. The illustrated methods produce (1) a carbonizable polymer-silica containing product, (2) a carbon-silica containing product, or (3) a bimodal porous carbon product.

This invention produces carbon particles with pore sizes uniformly in the mesopore size range of two to fifty nanometers in opening size. Smaller pore sizes, less than about two nanometers are termed micropores. Such pore sizes are usually too small for fuel cell catalyst support applications. Larger pore sizes, greater than about fifty nanometers, are termed macropores. Macropore size support particles are typically too large for fuel cell catalyst applications.

In accordance with this invention, a suitable surfactant is uniformly dispersed as micelles in a liquid medium (such as water) and used to form a well-dispersed mixture of a relatively low molecular weight carbonizable polymer and a silicate, such as ethyl orthosilicate. In a sense, the hydrophilic polymer and silica species can co-assemble with PEO containing surfactant hydrogen bonding because they each contain a large number of hydroxyl groups. The ordered polymer-silica nanocomposite is formed by simultaneous polymerization of carbon precursors and condensation of silicate species around the surfactant micelle. Then the surfactant is removed to produce a polymer-silica solid product characterized by a well ordered spatial arrangement of very small pores, typically of mesopore size. A relatively low molecular weight, liquid phenol-formaldehyde resol resin is a suitable carbonizable polymer precursor for the mesoporous product.

Preparation Phenol-formaldehyde Precursor Solution:

A water dispersible, liquid phenol-formaldehyde resin precursor was prepared in alkaline water solution at 70° C. In this example, 0.61 g phenol and 0.13 g 20% sodium hydroxide aqueous solution were mixed and stirred at 70° C. After the phenol was totally dissolved, 1.05 g (37%) formaldehyde aqueous solution was added drop-wise. The molar proportions were suitably about one part phenol and two parts formaldehyde. Then, the solution was stirred at 70° C. for one hour as the phenol-formaldehyde resole-type resin formed. The mixture was neutralized by the addition of hydrochloric acid. The polymer product is a viscous liquid having a molecular weight in the range of about 500 to about 5000. Water was removed from the reaction mixture by evaporation under reduced pressure.

Fabrication of Highly Ordered Mesoporous Polymer-silica Nanocomposite:

A surfactant, Triblock copolymer F127, was used as structure-directing agent for the carbon product to be produced by this invention. The surfactant is selected to interact with both the carbon and silica precursors by hydrogen bonding which makes it possible to co-assemble carbon and silica precursors, and surfactant to form a nanocomposite with highly ordered mesostructure. A suitable triblock copolymer consists of a central block of poly (propylene oxide) and end blocks of poly (ethylene oxide), symbolized as PEO-PPO-PEO. Such copolymers exhibit interesting physical properties when dispersed in a selective solvent for one of the block materials. In the case of F127, the PPO blocks impart hydrophobic behavior and the PEO blocks act as hydrophilic entities. The amphiphilic character of the block copolymer contributes self-assembling behavior resembling that of low molecular weight ionic surfactants. F127 (PEO106-PPO70-PEO106) used in this example co-assembles both triethyl orthosilicate and the resole polymer in intimate mixture in aqueous solution by hydrogen bonding.

When dispersed in water and the concentration of the surfactant is above the critical micelle concentration (CMC), micelles of liquid crystal phases are formed. These liquid crystal phases have shapes such as hexagonal, cubic, or lamellar shapes. The F127 tri-block copolymer appears to self-assemble in an aqueous medium into organized micelles. In the practice of this invention, the micelles interact with the TEOS and the resole polymer. The silicate is attracted to the hydrophilic portion of the surfactant and the organic resole, which contains —OH groups, interacts through hydrogen-bonding with the surfactant micelles. This association of the organic polymer and the silicate moieties with the micelles of surfactant amount to an organized assembly of the three constituents dispersed in the aqueous medium. Thus, an intimate mixture of silicate and resole polymer is obtained that yields solid polymer-silica structure with highly organized small pores, mesopores, after the solvent is evaporated and the surfactant is removed.

In this example, one gram of F127 was dissolved in 20 g ethanol, and, then, the above phenol-formaldehyde precursor resin was added to the ethanol solution and dissolved in it. In general, the molar portions of the mixture are suitably about 0.005 to about 0.02 parts F127 surfactant, one part phenol-formaldehyde resin (at one part phenol-two parts formaldehyde) and about 60 parts ethanol. The amount of ethanol is not critical as it is used to disperse the carbonizable polymer and silicate constituents.

An amount of tetraethyl orthosilicate (TEOS) precursor solution was added to the ethanol solution of surfactant and phenol-formaldehyde resin. In this specific example, the respective quantities were such that the following mole ratios were attained: TEOS:ethanol:HCl:water:F127 surfactant=1: 38:0.01:5.0:0.1. In general, these respective quantities are suitably about: TEOS:ethanol:HCl:water:F127 surfactant=1: 10-50:0.01:5:0.005-0.015. The ratio of TEOS to carbon may be adjusted from 0 to 1, which means the carbon ratio of the obtained nanocomposites can be varied from about 0 percent to about 100 percent.

The ethanol-water sol containing the mixture of surfactant, orthosilicate, and phenol-formaldehyde resin was shaken by an ultrasonic vibrator for 10 minutes to form a homogeneous precursor solution or dispersion. The solution was then transferred into a Petri dish and dried at room temperature for 1 day and 100° C. for 1 day to form a more or less solid phenol-formaldehyde polymer-silica-F127 composite. At this stage the solid is essentially non-porous.

The surfactant was removed from the mixture by calcining the material under nitrogen at 350° C. for 6 hours. Upon the decomposition of the surfactant, a highly ordered mesoporous polymer-silica nanocomposite remained.

A group of polymer-silica composites were prepared by varying the proportions of precursor polymer and orthosilicate. The BET surface areas and pore sizes of these carbon-based products were determined and the values summarized below. These properties are summarized following a description of methods for transforming the porous polymer-silica composites to porous carbon-silica composites, and the transformation of carbon-silica composites to bimodal porous carbon structures.

Preparation of Highly Ordered Mesoporous Carbon-silica Nanocomposite:

A group of highly ordered mesoporous polymer-silica nanosize pore-containing-composites were prepared with varying silica contents. The polymer-silica nanocomposites were directly carbonized under nitrogen at 900° C. for 4 hours without destroying the mesostructure. In other words, the non-carbon elements (oxygen and hydrogen) were removed from the polymer phase and silica phase of the composite material. The highly ordered mesoporous carbon-silica nanocomposites with tunable silica content from 0 to 100% can be prepared by carbonizing polymer-silica nanocomposites with different silica contents. In this example, the proportions of orthosilicate and phenolic resin were such that the ratio of silicon to carbon in the calcined product was 1:1.

Synthesis of Ordered Bimodal Mesoporous Carbon Materials:

The ordered bimodal mesoporous carbon samples were prepared by further removing silica species from mesoporous carbon-silica nanocomposite. The Si/C nanocomposites are highly ordered over a wide range of silicon-to-carbon ratios. It has been found that, when the weight percentage of silica in the Si—C composite is less than about seventy percent, the highly ordered mesostructure can be well preserved after removal of the silica. Additional small pores were formed after the removal of silica framework so the surface area and pore volume were dramatically increased. The new pores are typically different in size than the pores formed with the decomposition of the surfactant.

FIG. 1 is a flow diagram summarizing the above-described synthesis steps for the polymer-Si material containing a highly ordered arrangement of very small pores. The flow diagram then illustrates the carbonization of the carbonizable polymer to yield a highly ordered pore-containing carbon and silica complex. Then, the flow diagram illustrates the removal of the silica by etching with hydrogen fluoride to yield highly ordered pore-containing bimodal carbon.

Results

A series of samples were prepared using different ratios of polymer precursor and silica precursor. Samples are labeled as Polymer-Si-1, Polymer-Si-2, and Polymer-Si-3. Corresponding carbonized samples are labeled as Si—C-1, Si—C-2 and Si—C-3, respectively. After HF etching, corresponding samples are labeled as C-1, C-2 and C-3, respectively. The ratios of Si/C in these samples are 1/5, 1/1, 2/1, respectively.

Highly ordered mesoporous polymer-silica nanocomposites are synthesized by evaporation induced self-assembly of polymer, silicates and triblock copolymer F127 as described above. Since both silica species and phenol-formaldehyde polymer contain a large number of hydrophilic hydroxyl groups, they all assemble with triblock copolymer through hydrogen bonding. During the drying process, hydrolysis and condensation of TEOS and thermo-polymerization of phenol-formaldehyde occurs simultaneously, forming composite networks around triblock copolymer micelles.

Figure 2:
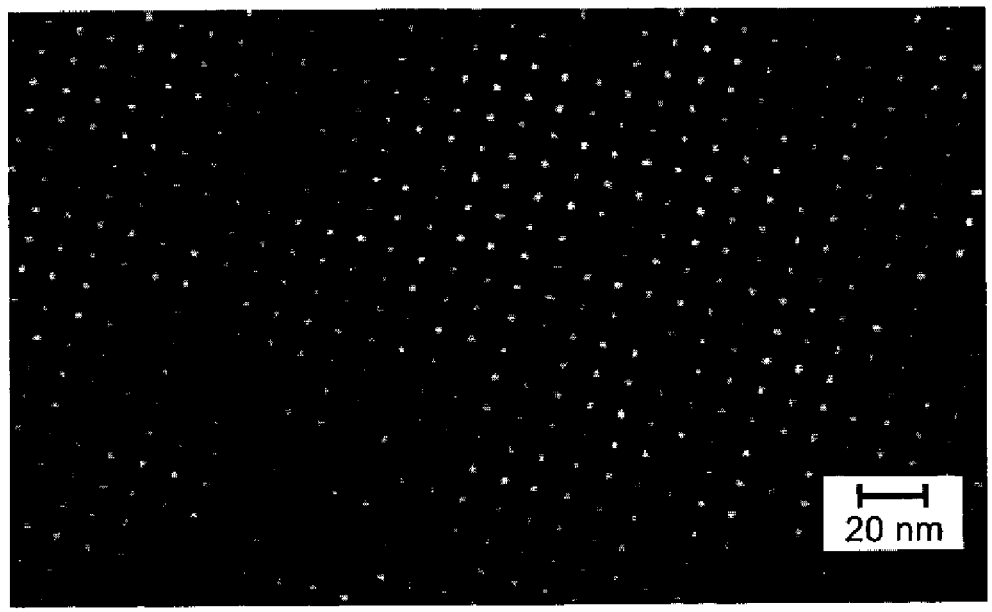
FIG. 2 is a transmission electron microscope (TEM) image of a first material, designated Polymer-Si-1, comprising phenolic polymer (resol) and silica after removal of the surfactant. In this view the mesoscale pores are seen as light spots arranged at the corners of cubes.

FIG. 2 is a transmission electron microscope (TEM) image of a first material, designated Polymer-Si-1, comprising phenolic polymer and silica after removal of the surfactant. In this view the mesoscale pores are seen as light spots. A highly ordered arrangement of pores is clearly seen.

Since both the silicate and resole species are organized or assembled by the F127 surfactant, most changes in the silicon to carbon ratio do not affect the ordered structure of the dried solid after the surfactant is removed. The carbon ratios in C—Si-1, C—Si-2, and C—Si-3 are about 80%, 50%, and 33%, respectively.

Figure 3:
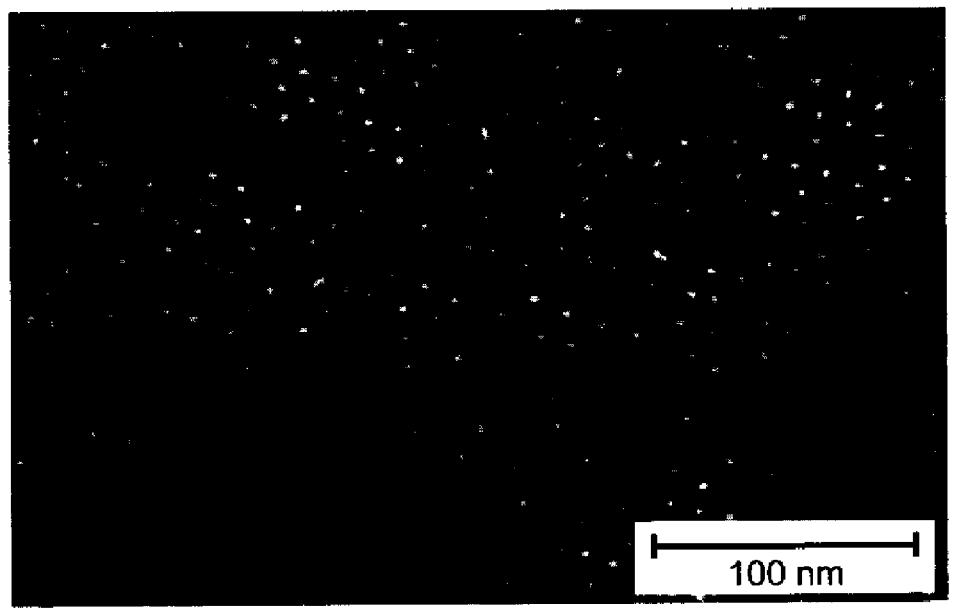
FIG. 3 is a transmission electron microscope (TEM) image of a second material, designated Polymer-Si-2, comprising phenolic polymer (resol) and silica after removal of the surfactant. In this view the mesoscale structures are seen as lines and spots.

FIG. 3 is an image of a transmission electron microscope (TEM) of a second material, designated Polymer-Si-2, comprising phenolic polymer and silica after removal of the surfactant (silica to carbon ratio about 50%). In this view the mesoscale structures are seen as light lines and spots.

Figure 5:
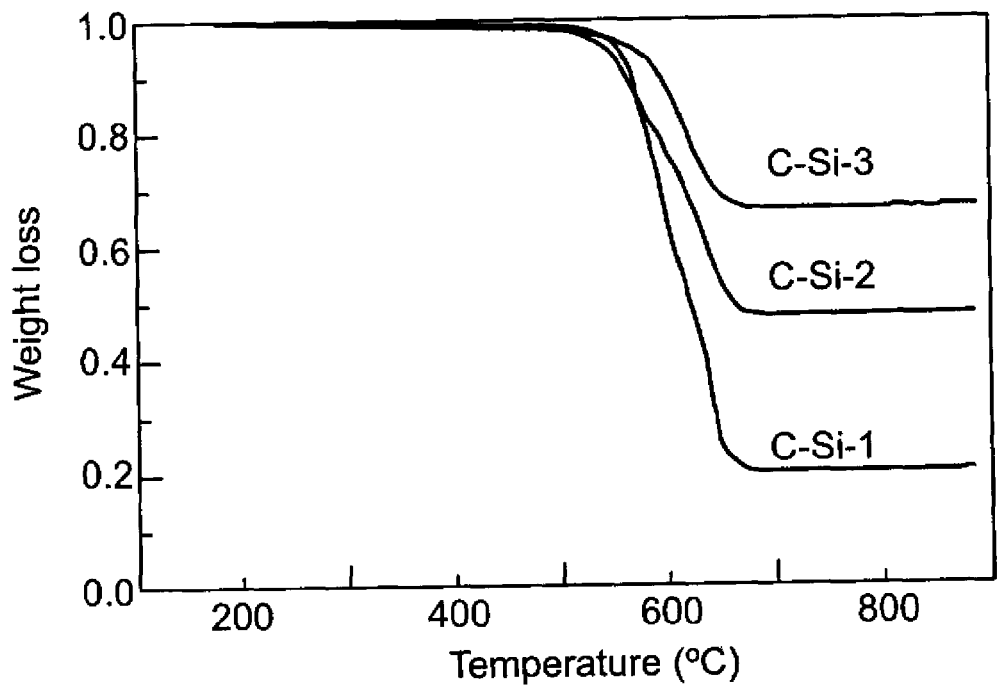
FIG. 5 is graph of thermogravimetric analyses (TGA) showing weight loss in the making of three illustrative mesoporous carbon-silica composites.

The carbon to silicon ratios were tested by subjecting C—Si-1, C—Si-2, C—Si-3 samples to TGA analysis under air. FIG. 5 shows the weight loss from the samples due mainly to oxidation of the non-carbon content of the samples. The weight loss is consistent with the non-carbon content used in the synthesis of the materials.

Figure 4:
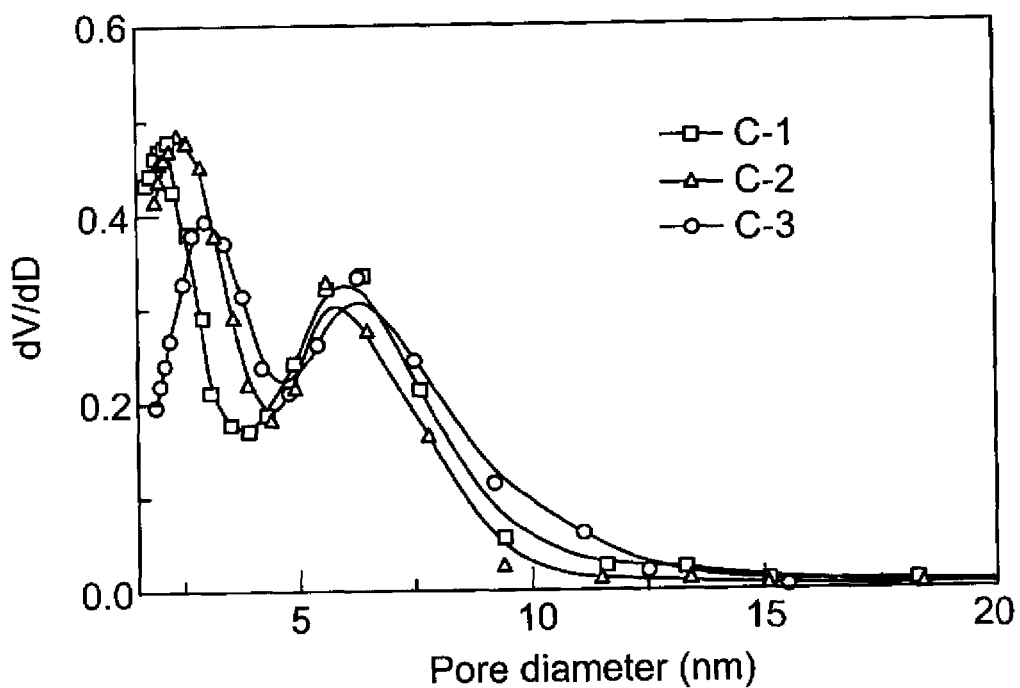
FIG. 4 is a graph showing the change in total pore volume (dV/dD) with pore diameter in nanometers in a carbon material after silica has been etched from the material. This graph illustrates the bimodal character of the pores in carbon particles after both non-carbon material and silica has been removed from precursor materials.

FIG. 4 is a graph illustrating pore-size distributions in three samples (C-1, C-2, and C-3) from which the silica had been leached. It is seen that each sample had groups of pores of two distinct pore sizes that contributed to the pore volume of the materials. One set of ordered pores of about the same size was formed when the surfactant and non-carbon volatiles were removed from the sample and a second set of pores of different size was formed when the silica was removed from the particles.

The porosity properties are summarized in Table 1 for all samples. The amount of incorporated silica has negligible effect on the surface area, pore size and pore structures.

After carbonization, polymer precursors decompose to carbon, forming silica-carbon nanocomposites. It has been found that, when the weight percentage of silica in silica-carbon composite is less than 70%, the highly ordered mesostructure can be preserved well during high temperature carbonization. The carbonization process transforms the polymer to carbon species, resulting in significant increase in surface areas and pore volumes, and a decrease of pore size 6~7 nm.

Pure porous carbons can be obtained by etching away the silica component using HF or NaOH wash. In addition to the mesopores directed by surfactant F127, smaller pores are created by silica removal. Such, a bimodal structured carbon can be obtained. These bimodal carbons have high surface area and pore volume as well as ordered structure, which could make them potential candidates for various applications.

TABLE 1

Porosity Properties for Polymer-Si—X, Si—C—X and C—X samples.

| Samples | Surface area (m$^2$/g) | Micropore Surface area (m$^2$/g) | Average pore size (nm) | Pore volume (cm$^3$/g) | Micropore volume (cm$^3$/g) |
|---|---|---|---|---|---|
| Polymer-Si-1 | 554 | 149 | 4.2 | 0.58 | 0.0.6 |
| Si—C-1 | 871 | 343 | 3.8 | 0.82 | 0.16 |
| C-1 | 1193 | 288 | 3.7 | 1.11 | 0.13 |
| Polymer-Si-2 | 545 | 148 | 4.2 | 0.54 | 0.06 |
| Si—C-2 | 834 | 308 | 3.6 | 0.74 | 0.14 |
| C-2 | 1589 | 97 | 4.0 | 1.59 | 0.06 |
| Polymer-Si3 | 600 | 89.0 | 5.3 | 0.79 | 0.03 |
| Si—C-3 | 688 | 200 | 4.9 | 0.84 | 0.09 |
| C-3 | 1653 | 21 | 5.3 | 2.21 | 0.01 |

Thus, this invention provides a method of preparing carbon-containing particles with small pores that are organized in a uniform arrangement. The pores provide enhanced surface area to the composites for gas absorption and for catalyst sites. The polymer-silica composites have application where their composition and pore arrangement provide suitable absorption and/or catalyst sites. The carbon-silica composites have application where their composition and pore arrangement provide suitable absorption and/or catalyst sites. And the bimodal porous carbon particles have application where their composition and pore arrangement provide suitable absorption and/or catalyst sites.

All these samples possess high surface area, large pore size, and total pore volumes which make them candidate support substrates and adsorbents for applications in catalysts and industrial purifications. The subject carbon/silica nanocomposites may have better anti-corrosion properties and better surface properties. The carbon samples contain two pore sizes and very high surface area. The larger pores provide a suitable gas and ion transport capability and the smaller pores provide enhanced adsorption surface.

The invention claimed is:

1. A method of making porous carbon-containing particles, the method comprising:
   forming a dispersion of a carbonizable polymer, a surfactant, and a silicate in a liquid medium;
   evaporating the liquid medium to leave a material characterized by uniformly inter-dispersed clusters of carbon based polymer, surfactant and silicate; and
   removing the surfactant to leave a first porous particulate solid material comprising carbonizable polymer and silica with spatially organized mesopores.

2. A method of making porous carbon-containing particles as recited in claim 1 in which the carbonizable polymer is a phenol-formaldehyde resole polymer and the silicate is an orthosilicate.

3. A method of making porous carbon-containing particles as recited in claim 1, the method further comprising:
   heating the first porous particulate solid material to remove elements of the carbonizable polymer other than carbon to leave a second particulate porous solid material comprising carbon and silica and having spatially organized mesopores.

4. A method of making porous carbon-containing particles as recited in claim 3, the method further comprising:
   removing silica from the second porous solid material to leave a third porous solid material comprising carbon particles comprising two groups of spatially organized mesosize pores, the pores in each group being of about the same size with the groups of pores having different average pore sizes.

5. A method of making carbon-containing particles with highly organized nanometer-size pores, the method comprising:
   forming a dispersion of a surfactant, a carbonizable polymer, and a silica precursor in a liquid medium, the surfactant serving as a molecular template to co-assemble the carbonizable polymer and silica precursor in the liquid medium to form a polymer/silica/surfactant composite after solvent removal; and
   removing the surfactant from the composite material to form a first porous solid material comprising carbon-containing and silica containing particles with spatially organized mesopores.

6. A method as recited in claim 5 in which the surfactant is a block copolymer comprising polypropylene central blocks and polyethylene oxide end blocks and the surfactant is dispersed in a water-containing liquid.

7. A method of making carbon-containing particles with highly organized nanometer-size pores as recited in claim 5 in which the carbonizable polymer is a phenol-formaldehyde resole polymer and the silicia precursor is tetraethyl orthosilicate.

8. A method of making carbon-containing particles as recited in claim 5, the method further comprising:
   heating the first porous solid material to remove elements of the carbonizable polymer other than carbon to leave a second porous particulate solid material comprising carbon and silica.

9. A method of making carbon-containing particles as recited in claim 8, the method further comprising:
   removing silica from the second porous solid material to leave a third porous solid material comprising carbon particles.

* * * * *